(12) United States Patent
Fueda

(10) Patent No.: US 12,600,301 B2
(45) Date of Patent: Apr. 14, 2026

(54) IMAGE CAPTURING APPARATUS, MOVABLE APPARATUS, IMAGE CAPTURING METHOD, AND STORAGE MEDIUM

(71) Applicant: CANON KABUSHIKI KAISHA, Tokyo (JP)

(72) Inventor: Ryo Fueda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/950,677

(22) Filed: Nov. 18, 2024

(65) Prior Publication Data

US 2025/0178536 A1 Jun. 5, 2025

(30) Foreign Application Priority Data

Dec. 4, 2023 (JP) ................................. 2023-204718

(51) Int. Cl.
*B60R 1/27* (2022.01)
*B60R 1/31* (2022.01)
*H04N 13/243* (2018.01)
*H04N 23/55* (2023.01)

(52) U.S. Cl.
CPC .................. *B60R 1/27* (2022.01); *B60R 1/31* (2022.01); *H04N 13/243* (2018.05); *H04N 23/55* (2023.01); *B60R 2300/107* (2013.01)

(58) Field of Classification Search
CPC ....... B60R 1/27; B60R 1/31; B60R 2300/107; H04N 13/243; H04N 23/55
USPC ......................................................... 348/837
See application file for complete search history.

(56) References Cited

U.S. PATENT DOCUMENTS

| | | | | |
|---|---|---|---|---|
| 11,132,817 | B2 * | 9/2021 | Suda ......................... | G06T 7/97 |
| 2003/0085999 | A1 * | 5/2003 | Okamoto .................. | B60R 1/27 |
| | | | | 348/E7.086 |
| 2012/0069153 | A1 * | 3/2012 | Mochizuki ................ | B60R 1/27 |
| | | | | 348/148 |
| 2012/0113261 | A1 * | 5/2012 | Satoh ...................... | G06T 19/00 |
| | | | | 348/148 |
| 2018/0376124 | A1 * | 12/2018 | Zhou .................. | G02B 27/0172 |
| 2019/0126827 | A1 | 5/2019 | Amagai | |

(Continued)

FOREIGN PATENT DOCUMENTS

JP 2017-224881 A 12/2017

OTHER PUBLICATIONS

Apr. 14, 2025 European Official Action in European Patent Appln. No. 24214715.5.

(Continued)

*Primary Examiner* — Justin W Rider
(74) *Attorney, Agent, or Firm* — Venable LLP

(57) ABSTRACT

In order to make it easier for a user of a movable apparatus to grasp the relationship between an automobile as a movable apparatus and the peripheral conditions thereof, an image capturing apparatus that is disposed on the movable apparatus comprises an image capturing unit configured to capture images of a portion or the entirety of a front side transparent member of the movable apparatus and at least one of a right lateral region and a left lateral region of the movable apparatus at the same time as a video image, wherein the image capturing unit is disposed in front of the front side transparent member of the movable apparatus.

20 Claims, 13 Drawing Sheets

(56) References Cited

U.S. PATENT DOCUMENTS

2020/0357144 A1* 11/2020 Suda .......................... B60R 1/26
2023/0101459 A1    3/2023 Nakahara
2025/0178536 A1*  6/2025 Fueda ....................... B60R 1/31

OTHER PUBLICATIONS

Valentinorossiracing, "Training with the VR46 Riders Academy at Mugello," May 11, 2017, XP093262376, retrieved from the Internet: URL:https://www.youtube.com/watch?v=7_v_CXsZba0.
Studiobinder, "How to Film a Car Scene—Everything to Know About Car Cinematography," Jan. 22, 2024, XP093262398, retrieved from the Internet: URL:https://www.youtube.com/watch?v=qNbTBI_hmSk.

* cited by examiner

OPTICAL AXIS

OPTICAL AXIS

IMAGE CAPTURING APPARATUS, MOVABLE APPARATUS, IMAGE CAPTURING METHOD, AND STORAGE MEDIUM

BACKGROUND OF THE INVENTION

Field of the Invention

The present invention relates to an image capturing apparatus, a movable apparatus, an image capturing method, a storage medium, and the like.

Description of the Related Art

In recent years, there has been a need to replace the room mirrors and side mirrors that are installed in vehicles with electronic mirrors. An electronic side mirror system is able to capture images in a wide range including regions that would be blind spots in traditional, physical side mirrors.

In contrast, as in, for example, Japanese Unexamined Patent Application, First Publication No. 2017-224881, a technology is known in which by synthesizing video images from a plurality of cameras that have been installed in a vehicle, a synthesized video image from a virtual viewpoint that has been set outside of the vehicle is formed. It becomes possible to understand the relationship between an automobile and its peripheral conditions by setting this virtual viewpoint to be diagonally above the automobile.

In a case in which a driver would like to understand the peripheral conditions of an automobile from an electronic side mirror video image, images are only captured of at least a portion of the side of the automobile, and therefore, it is difficult to grasp the relationship between the automobile and its peripheral conditions. In contrast, when implementing a technology such as that in Japanese Unexamined Patent Application, First Publication No. 2017-224881, complex processing such as projection conversion for each video image, synthesis of a video image, and the like in order to form a virtual viewpoint video image from video images from a plurality of cameras becomes necessary, and this becomes expensive.

SUMMARY OF THE INVENTION

An image capturing apparatus according to one aspect of the present invention is an image capturing apparatus that is disposed on a movable apparatus, wherein the image capturing apparatus comprises: an image capturing unit configured to capture images of a portion or the entirety of a front-side transparent member of the movable apparatus, and at least one of a right lateral direction region and a left lateral direction region of the movable apparatus at the same time as video images; wherein the image capturing unit is disposed in front of the front-side transparent member of the movable apparatus.

Further features of the present invention will become apparent from the following description of embodiments with reference to the attached drawings.

BRIEF DESCRIPTION OF THE DRAWINGS

FIG. 4A and FIG. 4B are schematic diagrams explaining the position of the first image capturing unit 100 according to the First Embodiment.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate descriptions will be omitted or simplified.

First Embodiment

In the First Embodiment, a method is explained in which, by disposing a camera facing forward and in the opposite direction in front of a front side transparent member such as the front glass of an automobile, or the like, a video image is displayed such that it is possible for a user to understand the relationship between the automobile and its peripheral conditions without the need for complex processing.

Note that although in the following explanation, an example is explained using the front glass (the front window) as the front side transparent member, the front side transparent member does not need to be made from glass, and may, for example, also be a transparent member consisting of resin or the like.

Figure 1:
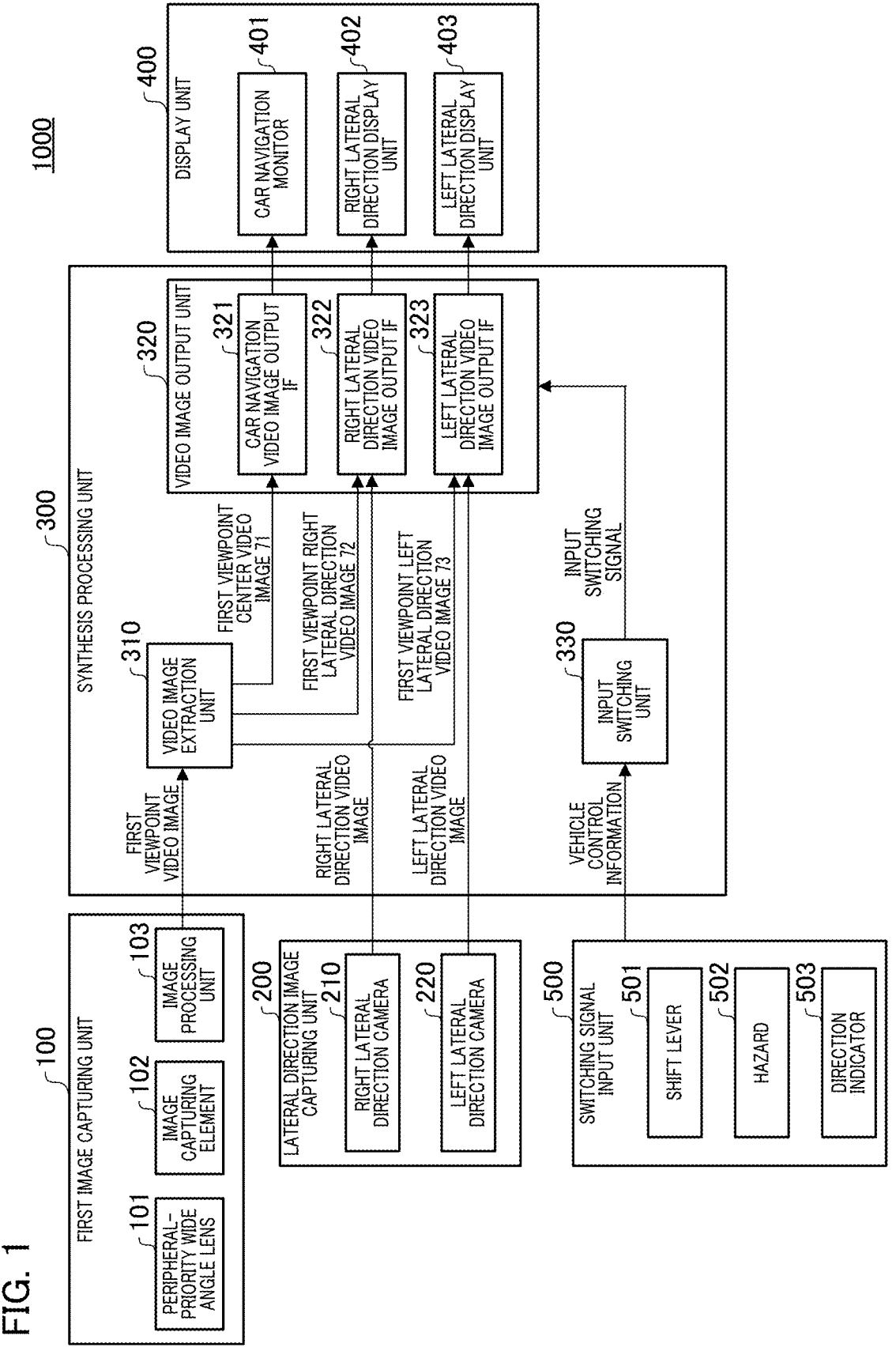
FIG. 1 is a functional block diagram that shows a configurational example of a vehicle periphery image capturing system 1000 according to a First Embodiment.

FIG. 1 is a functional block diagram showing a configurational example of a vehicle periphery image capturing system 1000 according to the First Embodiment. Note that a portion of the functional blocks that are shown in FIG. 1 are realized by a CPU or the like that serves as a computer, which is not shown and is included in the vehicle periphery image capturing system 1000, executing a computer program that has been stored on a memory that serves as a storage medium, which is also not shown.

However, it may also be made such that a portion or the entirety thereof is realized by hardware. As the hardware, an application specific integrated circuit (ASIC), a processor (a reconfigurable processor, a DSP), or the like can be used.

In addition, each of the functional blocks that are shown in FIG. 1 do not need to be encased in the same body, and they may also be configured by separate devices that have been connected to each other via signal paths. Note that the above explanation in relation to FIG. 1 also applies to FIG. 10 in the same manner.

The vehicle periphery image capturing system 1000 is disposed on a vehicle (automobile) that serves as a movable apparatus, and functions as an image capturing apparatus. The vehicle periphery image capturing system 1000 has a first image capturing unit 100, a lateral direction image capturing unit 200, a synthesis processing unit 300, a display unit 400, and a switching signal input unit 500.

Note that the entirety of the vehicle periphery image capturing system 1000 that serves as an image capturing apparatus and is shown in FIG. 1 does not need to be disposed on a movable apparatus, and a portion may also be disposed on, for example, an external terminal or the like that is able to communicate wirelessly. That is, for example, the synthesis processing unit 300 and the display unit 400, and the like may also be disposed on an external terminal for monitoring or controlling the movements of the movable apparatus.

The first image capturing unit 100 that serves as an image capturing unit is disposed in front of the front glass of an automobile, is installed such that the optical axis faces the rear direction of the vehicle that serves as the movable apparatus, and is a wide angle camera that is able to capture images from the left lateral direction to the right lateral direction of the automobile.

Note that the left lateral direction and the right lateral direction in the following explanation mean the left lateral direction and the right lateral direction when the front of the vehicle (the direction of the front glass) is seen from the driver's seat of the automobile. In addition, the front direction means the direction of the front glass (front window) as seen from the driver's seat of the automobile and the rear direction means the direction of the rear window as seen from the driver's seat of the automobile.

The lateral direction image capturing unit 200 is, for example, a camera that has been installed on the lateral side of the vehicle for use as an electronic side mirror, and comprises a right lateral direction camera 210 and a left lateral direction camera 220. Note that the right lateral direction camera 210 and the left lateral direction camera 220 are for example, disposed in the right end vicinity and the left end vicinity of the front glass of the vehicle, and are disposed so as to capture images of both the right rear direction and the left rear direction of the vehicle.

The synthesis processing unit 300 is, for example, a computer that is installed in the vehicle, and comprises a video image extracting unit 310, a video image output unit 320, an input switching unit 330, and the like. The video image output unit 320 comprises a car navigation video image output IF 321, a right lateral direction video image output IF 322, and a left lateral direction video image output IF 323.

The display unit 400 comprises, for example, a car navigation monitor 401 for use in a car navigation system, and a right lateral direction display unit 402 and a left lateral direction display unit 403 for use as electronic side mirrors that have been installed on the right front direction and the left front direction of the driver's seat.

The switching signal input unit 500 comprises, for example, a shift lever 501 for an automobile, a hazard button 502, and a direction indicator 503. In addition, the switching signal input unit 500 outputs each type of information that has been input into each in-vehicle component to be described below such as driving state information, hazard light information, drive direction information, direction indication information, and the like to the synthesis processing unit 300.

In this context, the switching signal input unit 500 functions as a control information acquisition unit that executes a control information acquisition step that acquires control information for a movable apparatus.

The shift lever 501 has driving state information such as, for example, parking P/reverse R/drive D/neutral N. The hazard button 502 has hazard light information such as, for example, a hazard light being illuminated/unilluminated. The direction indicator 503 has direction indicating information such as, for example, left/right/not indicated.

The first image capturing unit 100 has, a wide angle lens with a characteristic shape that will be described below (referred to below as a peripheral-priority wide angle lens 101), and an image capturing element 102 such as, for example, a CMOS image sensor, a CCD image sensor, and the like.

Figure 2:
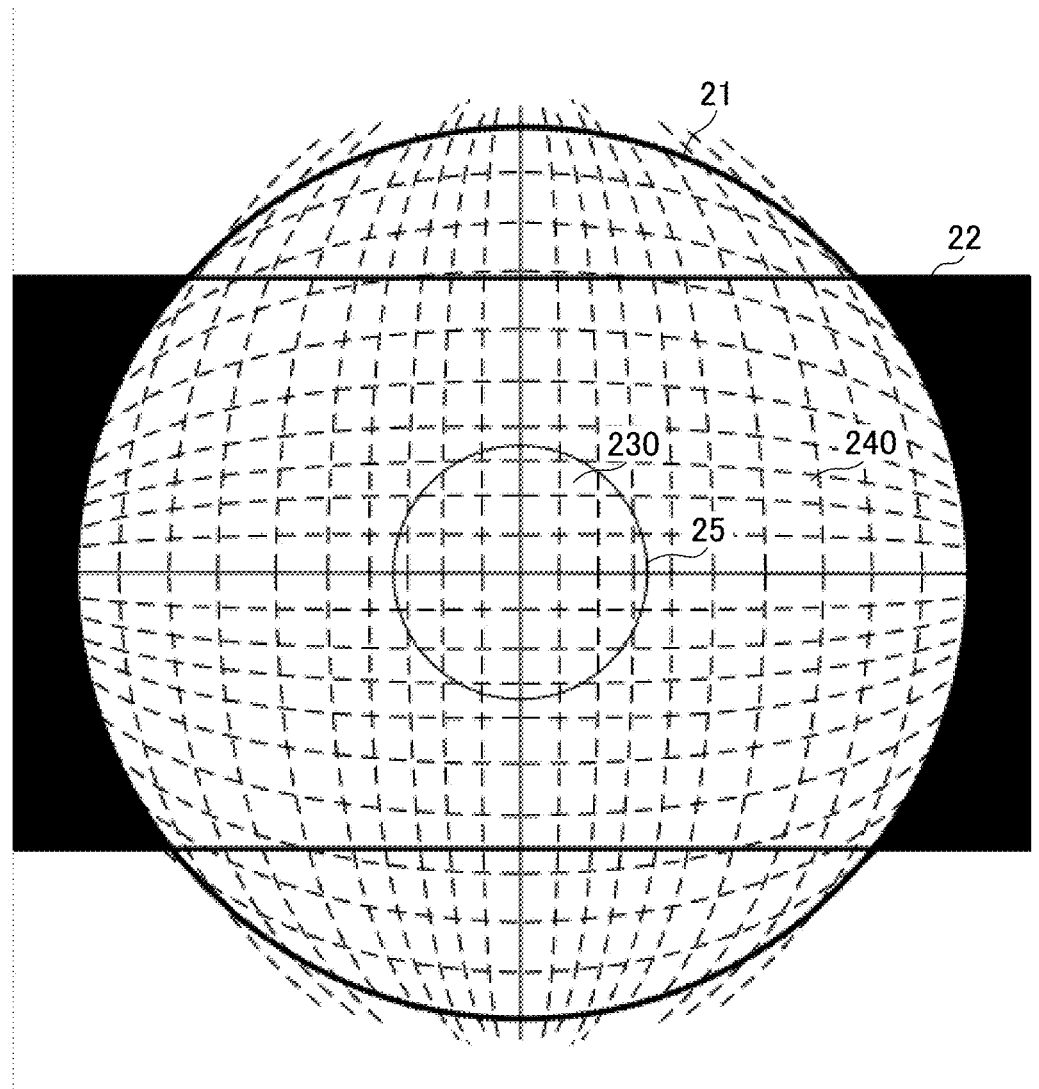
FIG. 2 is a schematic diagram explaining an optical characteristic of a peripheral-priority wide angle lens 101 according to the First Embodiment.

FIG. 2 is a schematic diagram that explains an optical characteristic of the peripheral-priority wide angle lens 101 according to the First Embodiment. As is shown in FIG. 2, the peripheral-priority wide angle lens 101 has an image circle 21 that is able to capture wide angle images at 180°, and is disposed in an image capturing region 22, which is a light receiving surface of the image capturing element 102, so as to be able to capture images at 1800 horizontally.

In addition, the peripheral-priority wide angle lens 101 has different image forming magnifications between a first angle of view (23 of FIG. 4) that includes the center of the optical axis, and a second angle of view (24 of FIG. 4) that is more towards the peripheral side than the first angle of view. In addition, as is shown in FIG. 2, within the image circle 21, a low resolution region 230, which captures images of objects that are included in the first angle of view, and a high resolution region 240 (a second region), which captures images of objects that are included in the second angle of view, are formed.

In addition, the peripheral-priority wide angle lens 101 has an optical property that is able to capture images at a higher resolution the closer to the edges of the lens that the image becomes. 25 is the border between the low resolution region 230 and the high resolution region 240.

Figures 3A, 3B:
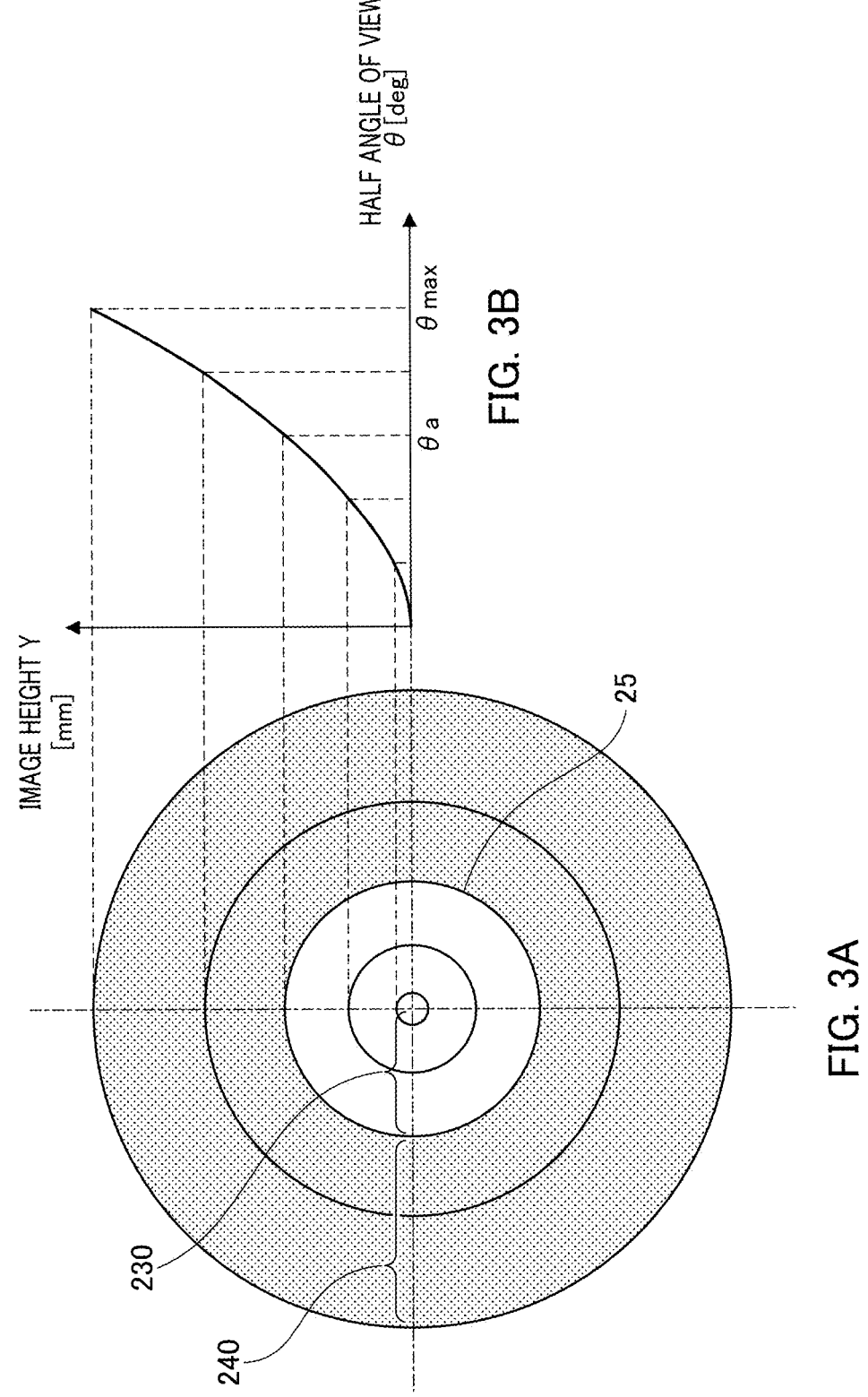
FIG. 3A and FIG. 3B are diagrams showing optical characteristics of a first image capturing unit 100 according to the First Embodiment.

FIGS. 3A and 3B are diagrams showing optical properties of the first image capturing unit 100 according to the First Embodiment. FIG. 3A is a diagram showing an image height y in each half angle of view on the image capturing surface (light receiving surface) of the image capturing element 102 in the form of a contour. FIG. 3B is a diagram showing the relationship between the half angle of view $\theta$ and the image height y in a first quadrant of FIG. 3A (the projection property of the peripheral-priority wide angle lens 101).

As is shown in FIG. 3B, the peripheral-priority wide angle lens 101 is configured such that the projection properties y(θ) of a first angle of view that is less that a predetermined half angle of view θa and a second angle of view that is greater than the half angle of view θa are different. Therefore, the peripheral-priority wide angle lens 101 is configured such that when the increase amount for the image height y in relation to the half angle of view θ per unit is made the resolution, this resolution becomes different based on the angle of view (region of the light receiving surface of the image capturing element).

This localized resolution can be expressed by the differential value dy (θ)/dθ at the half angle of view θ for the projection property y(θ). For example, it can be said that in FIG. 3B, the larger the slope of the projection property y(θ), the higher that the resolution becomes. In addition, FIG. 3A shows that the larger the interval between the contour lines of the image height y in each half angle of view is, the higher the resolution becomes.

In addition, in the peripheral-priority wide angle lens 101 of the present embodiment, the rate of increase (the slope of the projection property y(θ) in FIG. 3B) for the image height y is small in a central region that is in the vicinity of the optical axis (the first region). In addition, the peripheral-priority wide angle lens 101 has a projection property in which the rate of increase for the image height y becomes larger along with the angle of view becoming larger in a peripheral region (a second region) on the outer side of the central region.

In FIG. 3A, the low resolution region 230 that includes the center corresponds to an angle of view that is less than the half angle of view θa, and the high resolution region 240 on the outer side of the low resolution region corresponds to an angle of view that is equal to or greater than the half angle of view θa. In addition, the angle of view that is less than the half angle of view θa corresponds to the first angle of view 23 in FIG. 4, and the angle of view that is equal to or greater than the half angle of view θa corresponds to the second angle of view 24 in FIG. 4.

Note that the property that is shown in FIG. 2 is one example, and the present disclosure is not limited thereto. For example, the low resolution region and the high resolution region of the optical system do not need to be configured as concentric circles, and they may also be configured so that both regions have a distorted shape.

In addition, the center of the low resolution region and the center of the high resolution region do not need to be the same. In addition, the center of the low resolution region and the center of the high resolution region also do not need to be aligned with the center of the light receiving surface of the image capturing element. In the optical system of the present embodiment, it is sufficient if the low resolution region is formed in the vicinity of the optical axis, and the high resolution region is formed on the outer side (the peripheral side) of the low resolution region.

The peripheral-priority wide angle lens 101 is configured such that when the focal distance is made f, the half angle of view is made θ, the image height on the image surface is made y, the projection property, which represents the relationship between the image height y and the half angle of view θ, is made y(θ), and θ max is made the greatest half angle of view of the optical system, then the following Formula 1 is fulfilled. That is, the peripheral-priority wide angle lens 101 is configured such that the projection property y (θ) is different than 2f tan (θ/2) (stereographic projection formula).

$$0.2 < 2 \times f \times \tan(\theta \, max/2)/y(\theta \, max) < 0.92 \qquad \text{(Formula 1)}$$

In an optical system having such an optical property, it is possible to adjust the magnification in the radiation direction in relation to the optical axis by adjusting the projection characteristic y(θ).

It is thereby possible to control the aspect ratio of the radiation direction and the circumference direction in relation to the optical axis, and therefore, different than in a conventional fisheye lens or the like, it is possible to obtain images with a high resolution and a low amount of distortion in the peripheral region while having an angle of view that is a wide angle.

In addition, by fulfilling the Formula 1, it is possible to increase the resolution in the high resolution region 240 in comparison to an optical system with a stereographic projection formula. Note that if the upper limit of the Formula 1 is exceeded, the resolution in the high resolution region 240 will decrease, and the difference in resolutions between the high resolution region 240 and the low resolution region 230 will decrease, making this not preferable.

In addition, if a value falls below the lower limit of the Formula 1, it will become difficult to favorably correct aberrations such as field curvature and the like, and this is therefore also not preferable. Note that the above-explained Formula 1 is one example, and the optical system in the present embodiment is not limited to the Formula 1.

In the manner described above, in the optical system of the First Embodiment, a high resolution is obtained in the high resolution region 240, and the increase amount for the image height y in relation to the half angle of view θ per unit is made smaller in the low resolution region 230. Therefore, it is possible to obtain a high resolution in the high resolution region corresponding to the second angle of view for the peripheral side while making the image capturing range the same wide angle of view as for a fisheye lens.

In addition, in the present embodiment, the high resolution region has a projection property that is similar to the stereographic radiation formula (y=2×f×tan(θ/2), which is the projection property for an optical system for use in general image capturing. Therefore, it becomes possible to generate a highly detailed image with low optical distortion in the high resolution region.

As was explained above, in the First Embodiment, the image capturing surface (light receiving surface) of the image capturing element 102 comprises a low resolution region 230 (a first region) in which images are captured of subjects that are included in the first angle of view 23, and a high resolution region 240 (a second region) in which images are captured of objects that are included in the second angle of view 24.

In addition, the number of pixels per unit angle of view in the high resolution region 240 (the second region) become larger than the number of pixels per unit angle of view in the low resolution region 230 (the first region). That is, the resolution in the second region corresponding to the second angle of view 24 of the first image capturing unit 100 becomes higher than the resolution in the first region corresponding to the first angle of view 23.

Figures 4A, 4B:
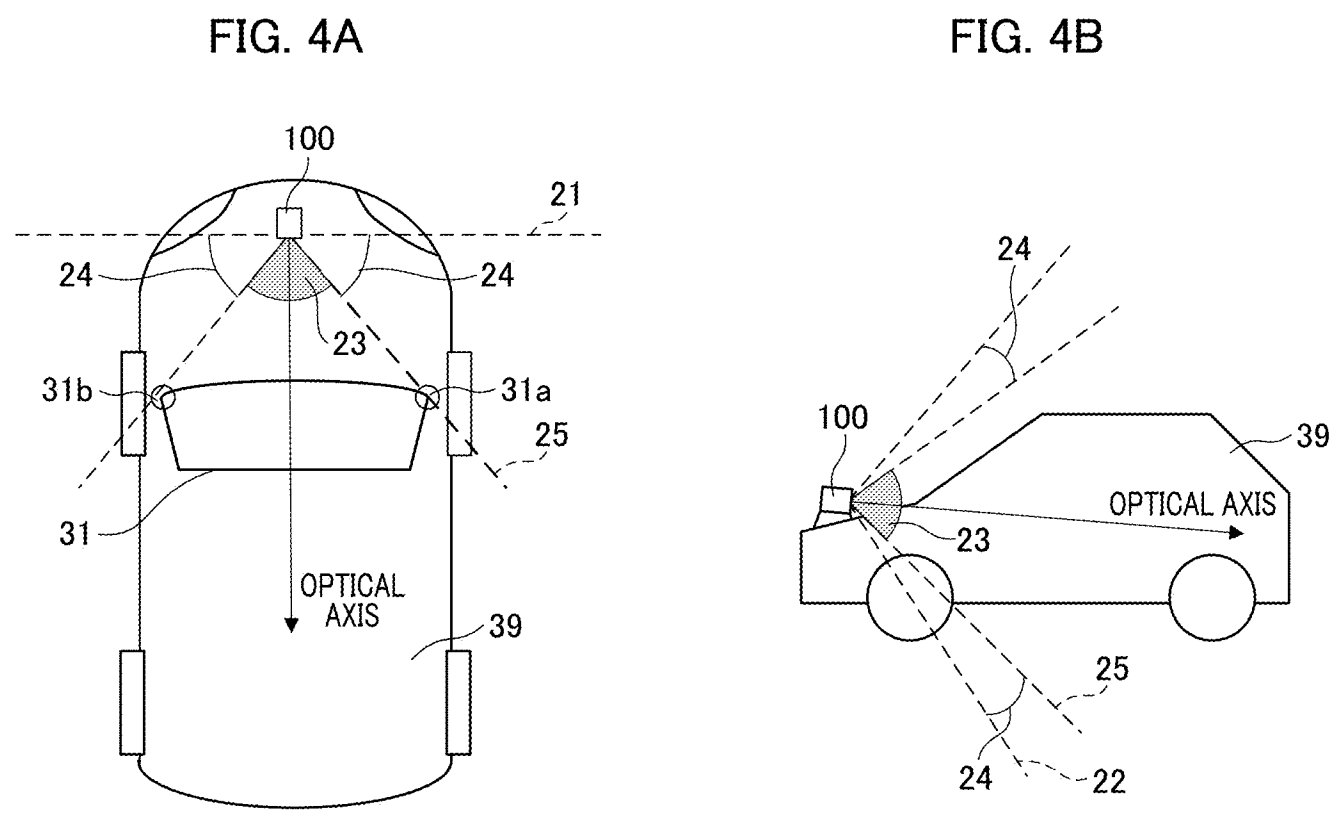

FIGS. 4A and 4B are schematic diagrams that explain the position of the first image capturing unit 100 in the First Embodiment. FIG. 4A is a diagram of a vehicle as seen from above, and FIG. 4B is a diagram of a vehicle as seen from the left lateral direction. As is shown in FIGS. 4A and 4B, the first image capturing unit 100 is disposed in front of the front glass 31 of the vehicle so as to capture images of the rear direction.

Therefore, it is possible to capture images of the rear direction including the surroundings of the front glass of the automobile such that, for example, the upper portion of the front bonnet, the left lateral direction, the front glass, and the right lateral direction of the automobile are included.

In addition, the automobile 39 is provided with an onboard system (driving assistance system), which is not shown, for supporting a user (a driver, a passenger, or the like), who is also not shown, by using images that have been acquired from the first image capturing unit 100. Note that although the present embodiment shows a case in which the first image capturing unit 100 is disposed in the center of the horizontal direction of the automobile 39, the first image capturing unit 100 does not need to be disposed in the center. In addition, the first image capturing unit 100 may also be disposed to the left, to the right, or the like of the horizontal direction in front of the automobile 29.

Figure 5:
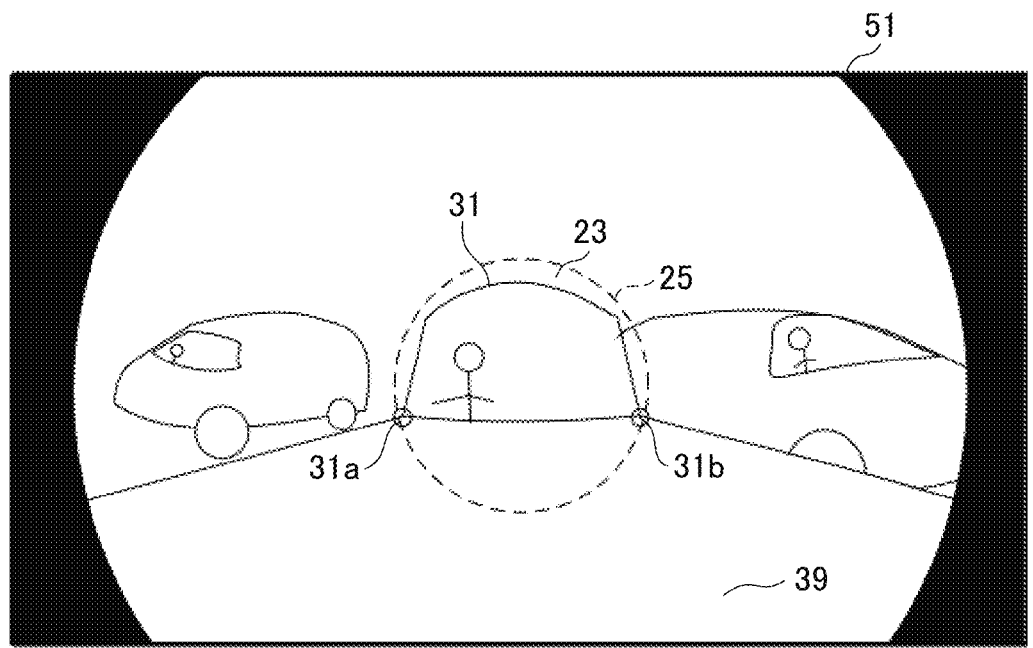
FIG. 5 is a schematic diagram explaining a first viewpoint video image that has been image captured by the first image capturing unit 100 in the First Embodiment.

FIG. 5 is a schematic diagram explaining a first viewpoint video image that has been captured by the first image capturing unit 100 in the First Embodiment. That is, in the First Embodiment, by disposing the first image capturing unit 100 in the manner shown in FIG. 4, it is possible to capture a first viewpoint video image 51 (a third person viewpoint video image) that captures images of the automobile, and both sides of the automobile's periphery in a third person viewpoint of the outside of the vehicle as is shown in FIG. 5.

In addition, it is possible to capture images with a high resolution by allocating a large number of pixels to the peripheral of the automobile in the left lateral direction and the right lateral direction while capturing images of the automobile by using the peripheral-priority wide angle lens 101. In addition, at this time, the peripheral-priority wide angle lens 101 is disposed such that the base of the front glass 31 of the automobile is included in the range of the low resolution region 230. That is, this lens is disposed such that images are captured of the base of the front glass in the first region.

More preferably, this lens is disposed such that the border 25 between the low resolution region 230 and the high resolution region 240 of the periphery-priority wide angle lens 101 passes through each peak 31a and 31b that form the base of the front glass 31 of the automobile.

By using this arrangement, it is possible to capture images by appropriately allocating the high resolution region to the periphery of the automobile while making the ratio from among the first viewpoint 51 that is taken up by the automobile smaller.

Returning to FIG. 1, in addition, the first image capturing unit 100 acquires an image capturing signal in which an optical image has been captured, and outputs a captured video image in which the image capturing signal has been RAW photo processed to the synthesis processing unit 300. Specifically, the first image capturing unit 100 has an image processing unit 103, and the image processing unit 103 De-Bayer processes an R, G, B color image capturing signal that has been input according to a Bayer array color filter from the image capturing element 102, and then converts this to a captured video image with an RGB cluster format.

Furthermore, the image processing unit 103 performs various types of correction processing such as white balance adjustments, gain/offset adjustments, gamma processing, color matrix processing, reversible compression processing, and the like. However, a so-called RGB image that has been RAW photo processed is formed without performing irreversible compression processing or the like. Note that the image processing unit 103 may also have a distortion aberration correction function.

The lateral direction image capturing unit 200 is a camera that is used for the purpose of an electronic side mirror that functions as a camera monitor system, and has both a right lateral direction camera 210 on the right lateral direction of the vehicle, and a left lateral direction camera 220 on the left lateral direction of the vehicle.

The right lateral direction camera 210 and the left lateral direction camera 220 are general onboard cameras that have been attached to a vehicle in the image capturing direction such that the regulations regarding indirect visibility for an electronic side mirror in a camera monitor system are fulfilled. The right lateral direction camera 210 captures right lateral direction video images, and the left lateral direction camera 220 captures left lateral direction video images.

Figure 6A:
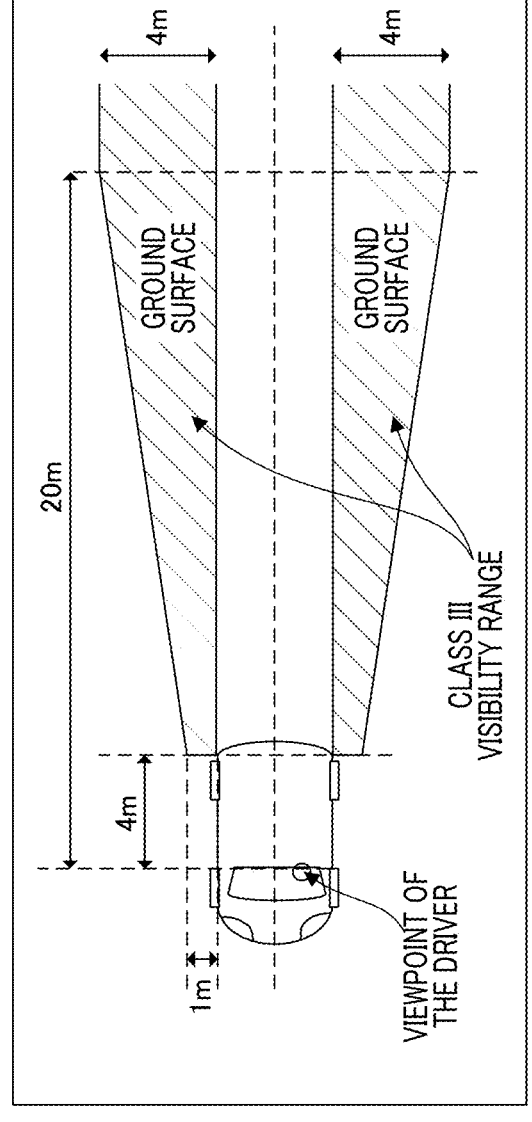
FIG. 6A, and FIG. 6B are schematic diagrams explaining field of vision ranges for the class III and class II that are stipulated by UN-R46
Figure 6B:
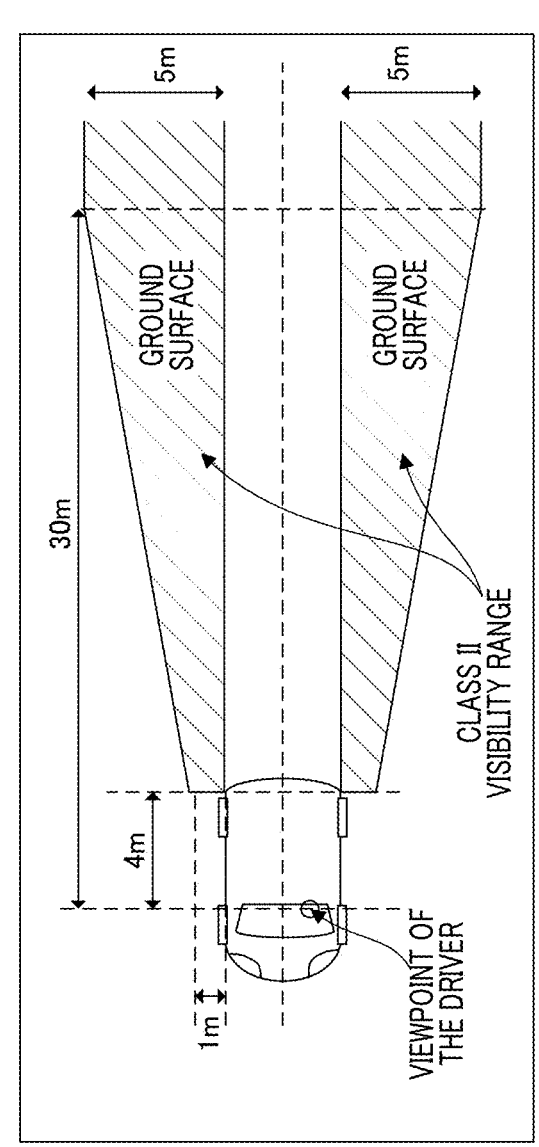

In this context, FIGS. 6A and 6B are schematic diagrams explaining a field of view range for a class III and a class II that are both stipulated by UN-R46, and show, in relation to the indirect visibility of the side mirror, a field of view range for the side mirror for class II and a field of view range for the side mirror for class III, which are stipulated by UN-R46.

In the case of, for example, an automobile with a passenger capacity of nine people or less, the right lateral direction camera 210 and the left lateral direction camera 220 are attached so as to be able to capture images of a field of view range for the class III, which is shown by the oblique lines in FIG. 6A. In addition, in the case of an automobile with a passenger capacity of ten people or more, the right lateral direction camera 210 and the left lateral direction camera 220 are attached so as to capture images of the field of view range for the class II, which is shown by the oblique lines in FIG. 6B. Note that although FIGS. 6A and 6B show a case in which the driver's seat is on the left side of the vehicle, this is the same even if the driver's seat is on the right side of the vehicle.

Returning to FIG. 1, in addition, the right lateral direction camera 210 outputs a right lateral direction video image and the left lateral direction camera 220 outputs a left lateral direction video image to the synthesis processing unit 300. The synthesis processing unit 300 has a video image extracting unit 310, a video image output unit 320, and the input switching unit 330. In addition, the input switching unit 330 outputs a switching signal that indicates switching between each video image to the video image output unit 320.

In addition, the synthesis processing unit 300 has a CPU and a program memory that stores a computer program, neither of which are shown, and controls the entirety of the vehicle periphery image capturing system 1000. In addition, the synthesis processing unit 300 has a storage unit that is not shown, and generates car navigation video images based on each type of car navigation information such as, for example, periphery maps, traffic regulations, destinations, and the like that have been held in the storage unit, and outputs this to the car navigation monitor 401 via the video image output unit 320.

Figure 7:
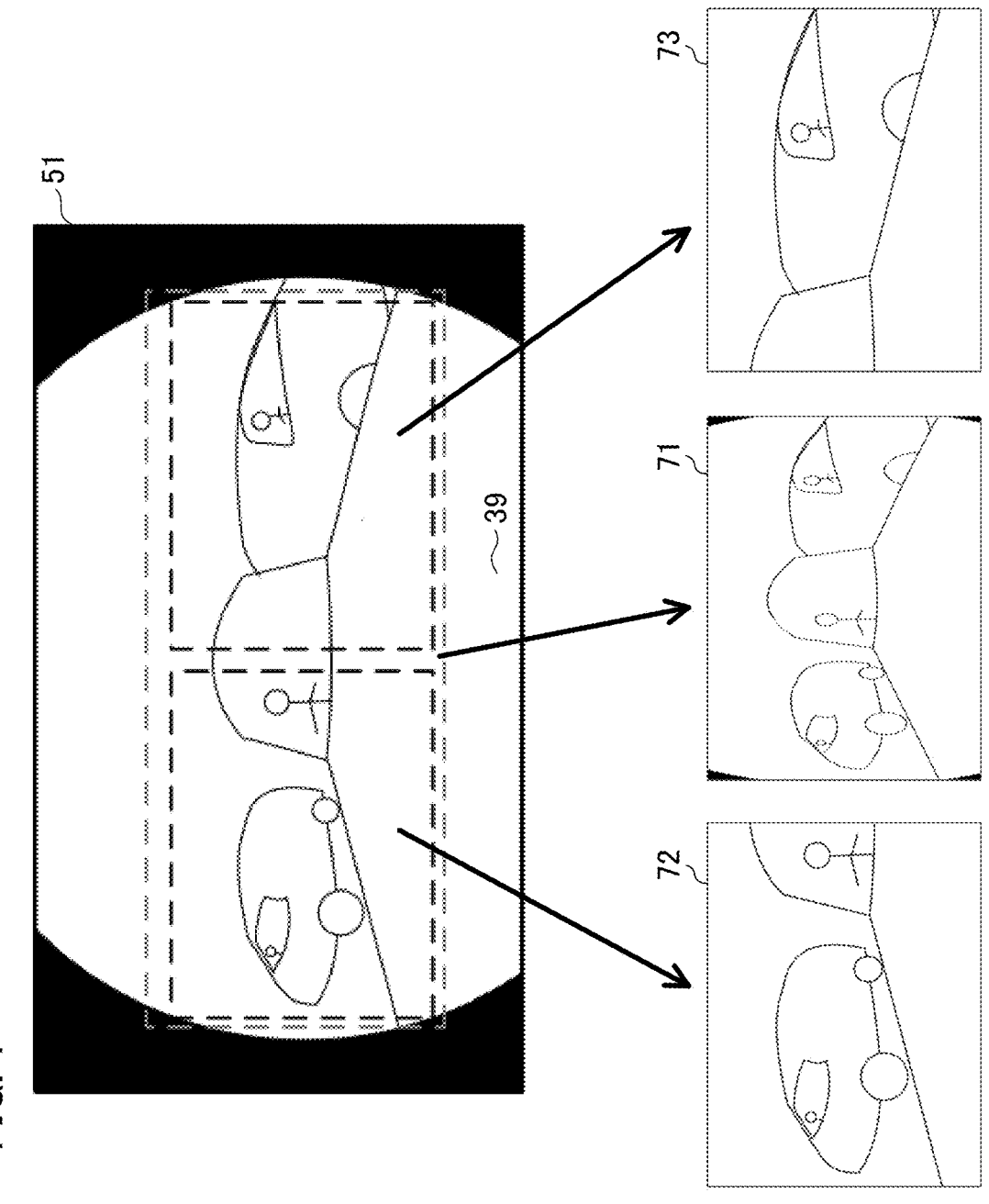
FIG. 7 is a schematic diagram explaining a range that is extracted from each video image from the first viewpoint by a video image extracting unit 310 according to the First Embodiment.

FIG. 7 is a schematic diagram explaining a range in which each video image from the first viewpoint is extracted by the video image extracting unit 310 according to the First Embodiment. The video extracting unit 310 performs the extraction of a first viewpoint center video image 71, a first viewpoint right lateral direction video image 72, and a first viewpoint left lateral direction video image 73 as shown in FIG. 7 from a first viewpoint video image 51 that has been acquired from the first image capturing unit 100.

At this time, the first viewpoint center video image is extracted so as to include the entirety of the front glass of the automobile, and both the right lateral direction and the left lateral direction of the automobile. Note that although in the example in FIG. 7, the first viewpoint center video image 71 is made almost the entire range of the first viewpoint video image 51, it is sufficient if this is a video image of a range with a pre-determined width that includes the center of the first viewpoint image 51.

In addition, the first viewpoint right lateral direction video image 72 is extracted such that it includes at least a portion of the front glass of the automobile that serves as a movable apparatus, and the right lateral direction from when the driver of the automobile is facing the front of the vehicle (the direction of the front glass). That is, the first image capturing unit 100 that serves as an image capturing unit is able to capture images of a portion or the entirety of the front glass of a movable apparatus and at least one of a region on the right side of the movable apparatus and a region on the left side of the movable apparatus at the same time.

In addition, the first viewpoint left lateral direction video image 73 is extracted so as to include at least a portion of the front glass of the automobile and the left lateral direction from when the operator of the automobile is facing the front of the vehicle (the direction of the front glass). By extracting each video image in this manner, it is possible to form each video image such that the relationship between the automobile and the peripheral state in the lateral direction of the automobile can be grasped.

In this manner, in the present embodiment, the video image extracting unit 310 executes a video image extraction step configured to extract a region comprising the front glass, and at least one of a region on the right side of the movable apparatus and a region on the left side of the movable apparatus as an extracted video image from the video image that has been captured by the image capturing unit.

In addition, the video image output unit 320 executes a video image output step configured to switch between a video image that has been captured by the image capturing unit and an extracted video image and to output this to a display unit based on control information from the switching signal input unit 500.

Note that although a case has been explained in FIG. 7 in which a first viewpoint video image 51 that does not invert left and right has been used, a first viewpoint image 51 that inverts left and right in order to associate the left to right of the display unit 400 and the left to right of the video image that has been captured may also be used.

Returning to FIG. 1, the video image extracting unit 310 outputs each of the first viewpoint center video image 71, the first viewpoint right lateral direction video image 72, and the first viewpoint left lateral direction video image 73 to the video image output unit 320. The video image output unit 320 has each output IF of the car navigation video image output IF 321, the right lateral direction video image output IF 322, and the left lateral direction video image output IF 323 as was explained above.

The car navigation video image output IF 321 switches between one of the car navigation video image or the first viewpoint center video image 71 based on a switching signal that has been input from the input switching unit 330, outputs the video image to the display unit 400, and displays it on the car navigation monitor 401.

For example, during the time in which a switching signal that indicates the display of the first viewpoint center video image 71 has not been input, the car navigation video image output IF 321 outputs a car navigation video image, and in contrast, if a switching signal that indicates the display of the first viewpoint center video image 71 is input, the car navigation video image output IF 321 outputs a video image by switching to the first viewpoint center video image 71.

The right lateral direction video image output IF 322 switches between either of the right lateral direction video direction video image and the first viewpoint right lateral direction video image 72, outputs one of these to the display unit 400 and displays the output video image on the right lateral direction display unit 402 based on the switching signal that has been input from the input switching unit 330. That is, during the time in which a switching signal that indicates the display of the first viewpoint right lateral direction video image 72 has not been input, the right lateral direction video image output IF 322 outputs the right lateral direction video image from the right lateral direction camera 210.

In contrast, if a switching signal that indicates the display of the first viewpoint right lateral direction video image 72 is input, the right lateral direction video image output IF 322 outputs a video image by switching to the first viewpoint right lateral direction video image 72.

The left lateral direction video image output IF 323 switches between the left lateral direction video image or the first viewpoint left lateral direction video image 73 and outputs one of these to the display unit 400 and displays the output video image on the left lateral direction display unit 403 based on a switching signal that has been input from the input switching unit 330. That is, during the time in which a switching signal that indicates the display of the first viewpoint left lateral direction video image 73 has not been input, the left lateral direction video image output IF 323 outputs the left lateral direction video image from the left lateral direction camera 220.

In contrast, if a switching signal that indicates the display of the first viewpoint left lateral direction video image 73 is input, the left lateral direction video image output IF 323 outputs a video image by switching to the first viewpoint left lateral direction video image.

Note that each of the video images that are output to the display unit 400 from the video image output unit 320, the first viewpoint center video image 71, the right lateral direction video image, the first viewpoint right lateral direction video image 72, the left lateral direction video image, and the first viewpoint left lateral direction video image 73 are left to right inverted such that the left to right of the display unit 400 is associated with the left to right of the video image that has been captured.

The input switching unit 330 generates a switching signal that indicates the switching of each video image to be displayed on the display unit 400 based on the input of vehicle control information from the switching signal input unit 500. The input switching unit 330 has a register that detects and holds the input/lack of input for the R (reverse) of the shift lever 501, the input/lack of input of the hazard button 502, and the right input/left input/lack of input of the direction indicator 503 to serve as control information for the vehicle.

In addition, during a time in which there is, for example an input for the R of the shift lever 501, or an input for the hazard button 502, the input switching unit 330 generates a switching signal for a high level that indicates the display of the first viewpoint center video image 71. Conversely, during a time in which there is no input for the R for the shift lever 501, or an input for the hazard button 502, the input switching unit 330 generates a switching signal for a low level.

In addition, during a time in which there is, for example, a right input for the direction indicator 503, the input switching unit 330 generates a switching signal for a high level that indicates the display of the first viewpoint right lateral direction video image 72. In addition, during a time in which there is a left input for the direction indicator 503 as well, the input switching unit 330 generates a switching signal for a high level that indicates a display of the first viewpoint left lateral direction video image 73. Conversely, in a case in which there is neither a right input or a left input for the direction indicator 503, the switching unit 330 generates a switching signal for a low level.

In this manner, by switching the video image display based on control information for the vehicle, it is possible to make it easier for a user to automatically grasp the relationship between an automobile and its peripheral conditions at a timing at which the driver needs to confirm the peripheral conditions of the automobile.

Note that the conditions for generating a switching signal are not limited to the conditions that have been described above. For example, the conditions for generating a high level switching signal that indicates the display of the first viewpoint right lateral direction video image 72 may also be made a time in which there is no input of an R for the shift lever 501, and also no input of the hazard button 502, while there is a right input for the direction indicator.

In contrast, in a case in which there is an input of an R for the shift lever 501, or an input for the hazard button 502, a low level switching signal may also be generated even if there is a right input for the direction indicator 503.

In addition, the conditions for generating a switching signal for a high level that indicates the display of a first viewpoint left lateral direction video image 73 may also be made during a time in which there is no input of an R for the shift level 501 as well as no input for the hazard button 502, but there is a left input for the direction indicator. In contrast, a switching signal for a low level may also be generated even if there is a left input for the direction indicator 503 in a case in which there is an input for an R for the shift lever 501 or an input for the hazard button 502.

In addition, it may also be made such that the first viewpoint right lateral direction video image 72 or the first viewpoint left lateral direction video image is displayed only when the first viewpoint center video image 71 is not being displayed. In addition, the state of the shift lever 501 that is detected in the register may also be made to detect and hold the input/lack of input of an R or P (park). In addition, in such a case, it may also be made such that a switching signal for a high level that indicates the display of the first viewpoint center video image 71 is also generated at a time when there is an input of a P for the shift lever 501, and the first viewpoint center video image is displayed.

Figure 8:
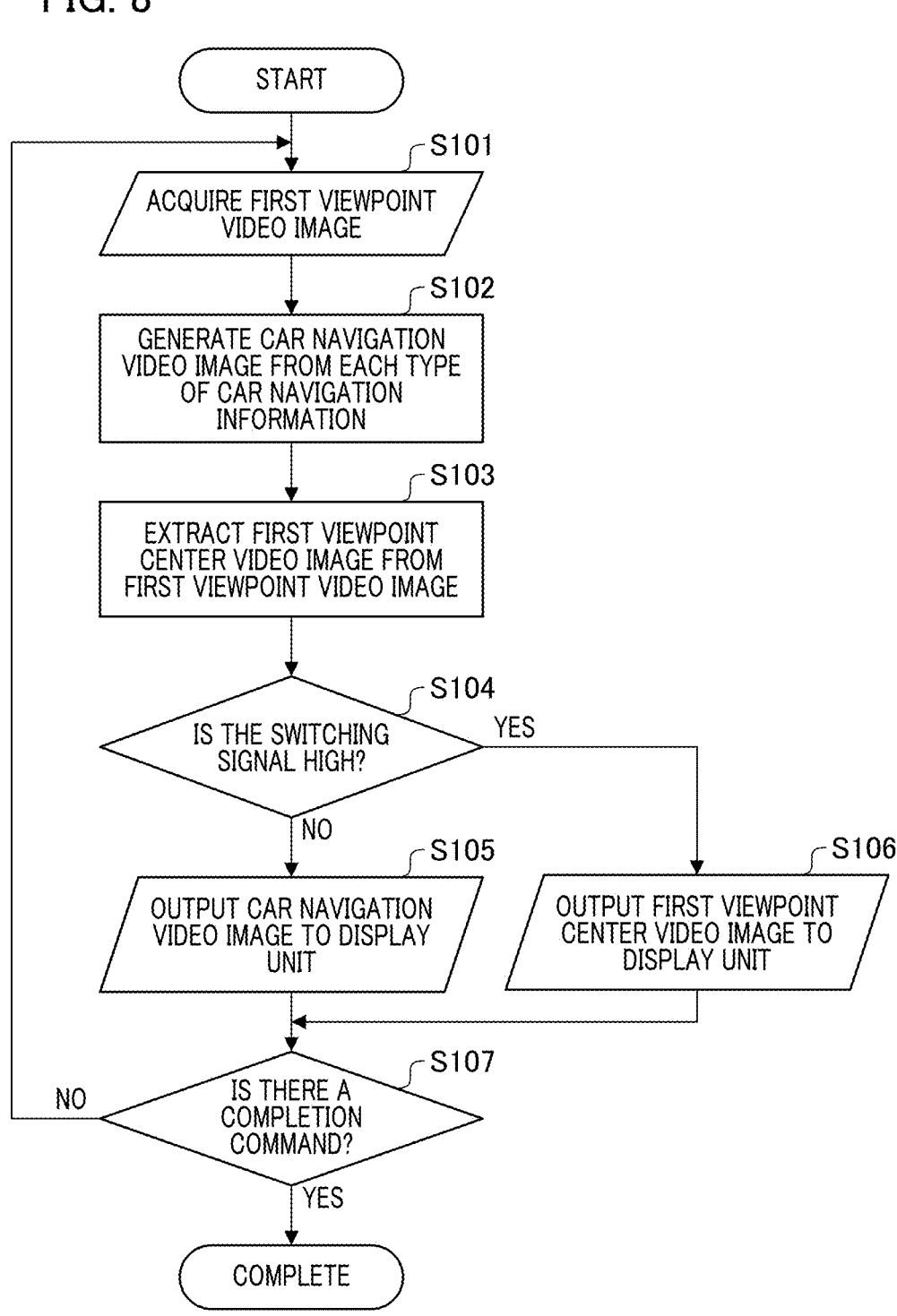
FIG. 8 is a flowchart showing an example of an image capturing method in which a synthesis processing unit 300 outputs a car navigation video image in the First Embodiment.
Figure 9:
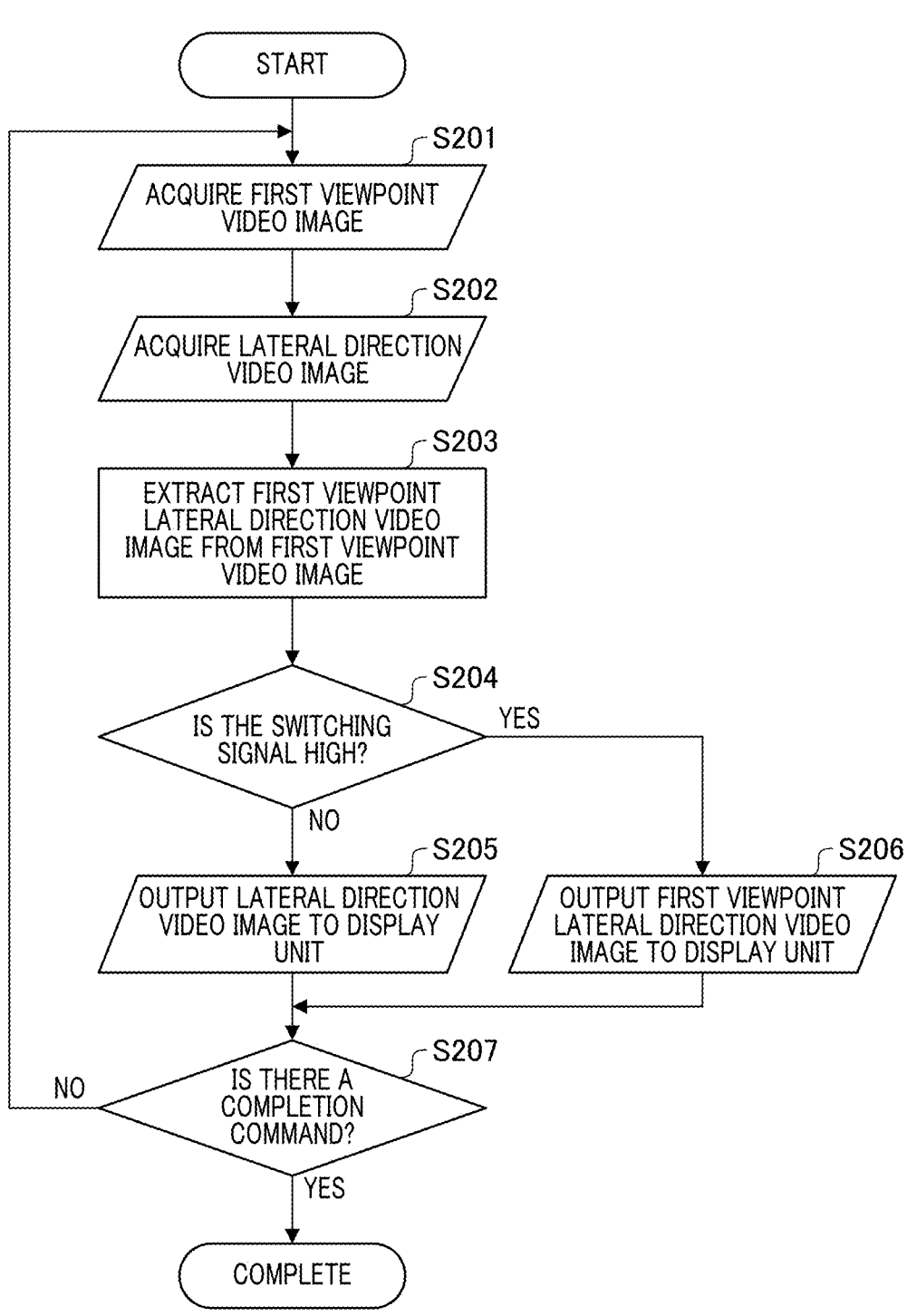
FIG. 9 is a flowchart showing an example of an image capturing method in which a synthesis processing unit 300 outputs a lateral direction video image in the First Embodiment.

FIG. 8 is a flowchart showing an example of an image capturing method in which the synthesis processing unit 300 outputs a car navigation video image in the First Embodiment, and FIG. 9 is a flowchart showing an example of an image processing method in which the synthesis processing unit 300 outputs a lateral direction video image in the First Embodiment. The processing for each step in FIG. 8 and FIG. 9 is performed in in order by the CPU, which functions as a computer and is not shown, of the synthesis processing unit 300 executing the computer program, which has been stored on the memory that is also not shown.

The operations for switching to a car navigation video and outputting this to the display unit 400 will be explained with reference to FIG. 8. During step S101, the first viewpoint video image 51, which has captured a region comprising the left lateral direction, the front glass, and the right lateral direction of the automobile is acquired from the first image capturing unit 100. In this context, the first viewpoint video image 51 is input into the video image extracting unit 310. After this, the processing proceeds to step S102.

During step S102, each type of car navigation information such as a peripheral map, traffic regulations, a destination, and the like is acquired from a database, which is not shown, and a car navigation video image is generated. In this context, the car navigation video image is input to the video image output unit 320. After this, the processing proceeds to step S103.

During step S103, the first viewpoint center video image 71 is extracted from the first viewpoint video image 51. In this context, the first viewpoint center video image 71 is extracted so as to include the entirety of the front glass of the automobile, and both the right lateral direction and the left lateral direction of the automobile. After this, the first viewpoint center video image 71 is input into the video image output unit 320. After this, the processing proceeds to step S104.

During step S104, it is determined whether or not the switching signal from the switching signal input unit 500 that indicates the display of the first viewpoint center video image 71 is high. As was described above, the switching signal becoming high is made during a time in which, for example, there is at least one of an input of an R or an input of a P input for the shift lever 501, or an input for the hazard button 502. If the determination results are No, the processing proceeds to step S105, and if the determination results are yes, the processing proceeds to step S106.

During step S105, the car navigation video is output to the display unit 400. After this, the processing proceeds to step S107. During step S106, the first viewpoint center video image 71 is output to the display unit 400. After this, the processing proceeds to step S107.

During step S107, it is determined whether or not there has been a completion command from the user. If the determination results are no, then the processing proceeds to step S101, and if the determination results are yes, then the processing for the flow in FIG. 8 is completed. Note that for example, the completion command from the user is made yes in a case in which, in a state in which the on/off for the engine of the vehicle is input into the synthesis processing unit 300, the synthesis processing unit 300 has detected that the engine is off.

Next, the operations for switching to either the right lateral direction video image or the left lateral direction video image and outputting this to the display unit 400 will be described with reference to FIG. 9.

During step S201, the first viewpoint video image 51, which has captured a range including the left lateral direction, the front glass, and the right lateral direction of the automobile is acquired from the first image capturing unit 100. In this context, the first viewpoint video image 51 is input into the video image extracting unit 310. After this, the processing proceeds to step S202.

During step S202, the right lateral direction video image and the left lateral direction video image are acquired from the lateral direction image capturing unit 200. In this context, the right lateral direction video image and the left lateral direction video image are input into the video image output unit 320. After this, the processing proceeds to step S203.

During step S203, the first viewpoint right lateral direction video image 72 and the first viewpoint left lateral direction video image 73 are extracted from the first viewpoint video image 51. In this context, the first viewpoint right lateral direction video image 72 is extracted so as to include at least a portion of the front glass of the automobile and the right lateral direction of the automobile.

In addition, the first viewpoint left lateral direction video image 73 is extracted so as to include at least a portion of the front glass of the automobile and the left lateral direction of the automobile. After this, the first viewpoint right lateral direction video image 72 and the first viewpoint left lateral direction video image 73 are input into the video image output unit 320. After this, the processing proceeds to step S204. During step S204, it is determined whether or not the switching signal that indicates the display of the first viewpoint right lateral direction video image 72 or of the first viewpoint left lateral direction video image 73 from the switching signal input unit 500 is high.

The switching signal becomes high in a case in which, for example, there is no input for any of an R or a P for the shift lever 501, and there is no input for the hazard button 502, while there is a right input or a left input for the direction indicator 503. If the determination results are no, then the processing proceeds to step S205, and if the determination results are yes, then the processing proceeds to step S206.

During step S205, the right lateral direction video image or the left lateral direction video image is output to the display unit 400. After this, the processing proceeds to step S207. During step S206, the first viewpoint right lateral direction video image 72 or the first viewpoint left lateral direction video image 73 is output to the display unit 400 according to the right input or the left input of the direction indicator 503. After this, the processing proceeds to step S207.

During step S207, it is determined whether or not there has been a completion command from the user. If the determination results are No, the processing proceeds to step S201, and if the determination results are Yes, the processing for the flow in FIG. 9 is completed. As was described above, in the present embodiment, it is possible to display each video image for the first viewpoint on each monitor without performing the processing for projection conversion for each video image or video image synthesis.

That is, according to the First Embodiment, image capturing is performed such that images are captured of the front direction and the reverse direction of the automobile so as to include the right lateral direction, the front glass, and the left lateral direction from the first viewpoint that is in front of the front glass of the automobile. Therefore, it is possible to capture video images of both the automobile and the periphery of the automobile at the same time.

Further additionally, it is possible to capture images at a high resolution by widely allotting pixels to the left lateral direction and right lateral direction of the automobile and the periphery of the automobile while capturing images of the automobile using the peripheral-priority wide angle lens 101. In addition, by extracting each of the first viewpoint center video image 71, the first viewpoint right lateral direction video image 72, and the first viewpoint left lateral direction video image 73 such that the front glass of the automobile is included it becomes possible to form each video image such that the user can grasp the relationship between the automobile and the peripheral conditions for the lateral directions of the automobile.

In addition, by switching the video image display based on the control information for the vehicle, it is possible for the user to grasp the relationship between the automobile and the peripheral conditions thereof at the timing at which it is necessary for the driver to confirm the peripheral conditions. In addition, as is shown in FIG. 8 and FIG. 9, it is possible to display each video image for the first viewpoint on each monitor without performing the processing for projection conversion for each video image and video image synthesis.

Therefore, it is possible to realize a vehicle periphery image capturing system that does not need to perform the complex image processing of projection conversion for each video image and video image synthesis, and that switches between video images on each monitor at the timing at which the driver needs to confirm the peripheral conditions, and it is possible for the user to grasp the relationship between the automobile and the peripheral conditions thereof.

Note that the control information for the vehicle may also be the rotation direction and rotation amount for a handle for use in steering, vehicle speed, the acceleration rate of the vehicle, car navigation information, and the like. That is, the control information for the vehicle includes at least one of an input of an R or an input of a P for the shift lever 501, the input for the hazard button 502, the input for the direction indicator 503, the rotation direction and rotation amount for the handle for steering, the vehicle speed, the degree of acceleration for the vehicle, or car navigation information.

Second Embodiment

In the Second Embodiment, by disposing one camera for each of the right front direction and the left front direction in front of the front glass of the automobile such that they each face the rear direction of the vehicle, image capturing is performed that combines a video image in which it is possible to grasp the relationship between the automobile and the peripheral conditions thereof with a lateral direction video image for use in an electronic side mirror.

Figure 10:
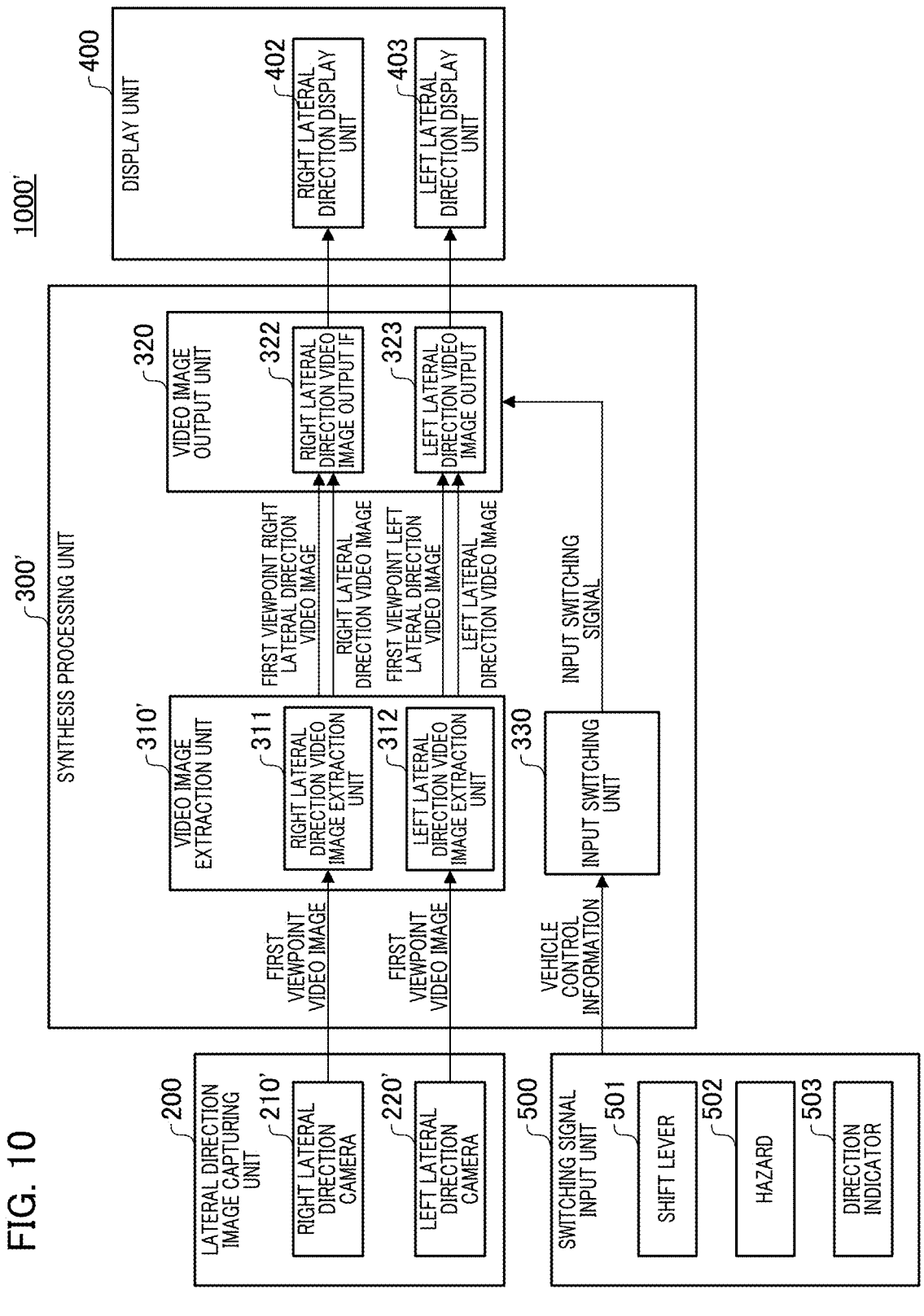
FIG. 10 is a functional block diagram showing a configurational example of a vehicle periphery image capturing system 1000' according to a Second Embodiment.

FIG. 10 is a functional block diagram showing a configurational example of a vehicle periphery image capturing system 1000' according to the Second Embodiment. In FIG. 10, functional blocks that have the same reference number as functional blocks in FIG. 1 are functional blocks that have the same functions. Note that 210' is a right lateral direction camera, 220' is a left lateral direction camera, 300' is a synthesis processing unit, and 310' is a video image extracting unit In FIG. 10, the right lateral direction camera 210' and the left lateral direction camera 220' are attached such that they are able to capture images in a range that fulfills the field of view range for a side mirror for the class II and the class III as stipulated by UN-R46 with respect to the indirect visibility for each electronic side mirror.

Figure 11:
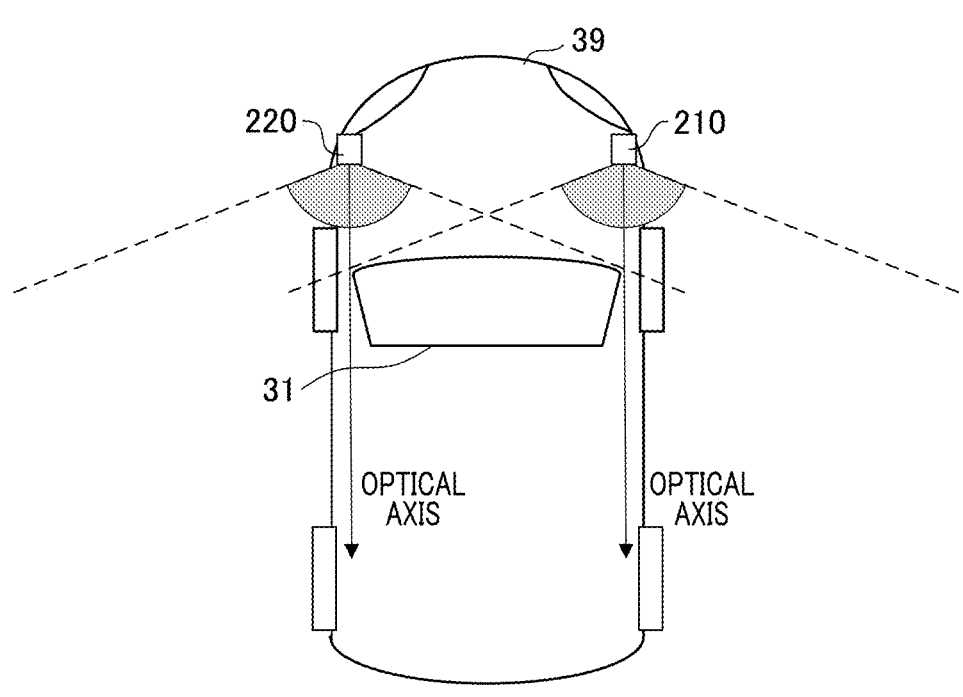
FIG. 11 is a schematic diagram that explains the position of a lateral direction image capturing unit 200 according to the Second Embodiment.

FIG. 11 is a schematic diagram explaining the position of the lateral direction image capturing unit 200 according to the Second Embodiment. As is shown in FIG. 11, the right lateral side camera 210', which serves as a second image capturing unit, is disposed on the right lateral side from the center of the front glass of the automobile, such that it includes the right lateral side and the front glass 31 of the automobile and such that the optical axis faces the rear direction of the automobile.

That is, the image capturing unit of the Second Embodiment captures images of a portion of the front glass and a region on the right side of the movable apparatus (including the immediate right side of the vehicle) at the same time in a case in which a portion of the right side of the front glass is being imaged captured. In addition, the right lateral side direction camera 210' has a periphery-priority wide angle lens with an optical property such as that shown in FIGS. 3A and 3B, and an image capturing element.

Note that in the same manner, the left lateral direction camera 220' that serves as a first image capturing unit, as is shown in FIG. 11, is disposed towards the left lateral direction from the center of the front glass of the automobile so as to include the left lateral side and the front glass 31 of the automobile, and such that the optical axis faces the rear direction of the automobile.

That is, the image capturing unit of the Second Embodiment captures images of a portion of the front glass and a region on the left side of the movable apparatus (including the immediate left side of the automobile) at the same time in a case in which a portion of the left lateral side of the front glass is being image captured. In addition, the left lateral direction camera 220' also has a peripheral-priority wide angle lens with an optical characteristic such as that shown in FIGS. 3A and 3B, and an image capturing element.

By having this arrangement, it is possible to achieve both image capturing of video images of each lateral side for use in an electronic side mirror and image capturing of a first viewpoint video image 51 for each lateral direction in both the right lateral direction and the left lateral direction. The video image extracting unit 310' of FIG. 10 has a right lateral direction video image extracting unit 311 and a left lateral direction video image extracting unit 312, and is able to extract a video image corresponding to an electronic side mirror.

Figure 12:
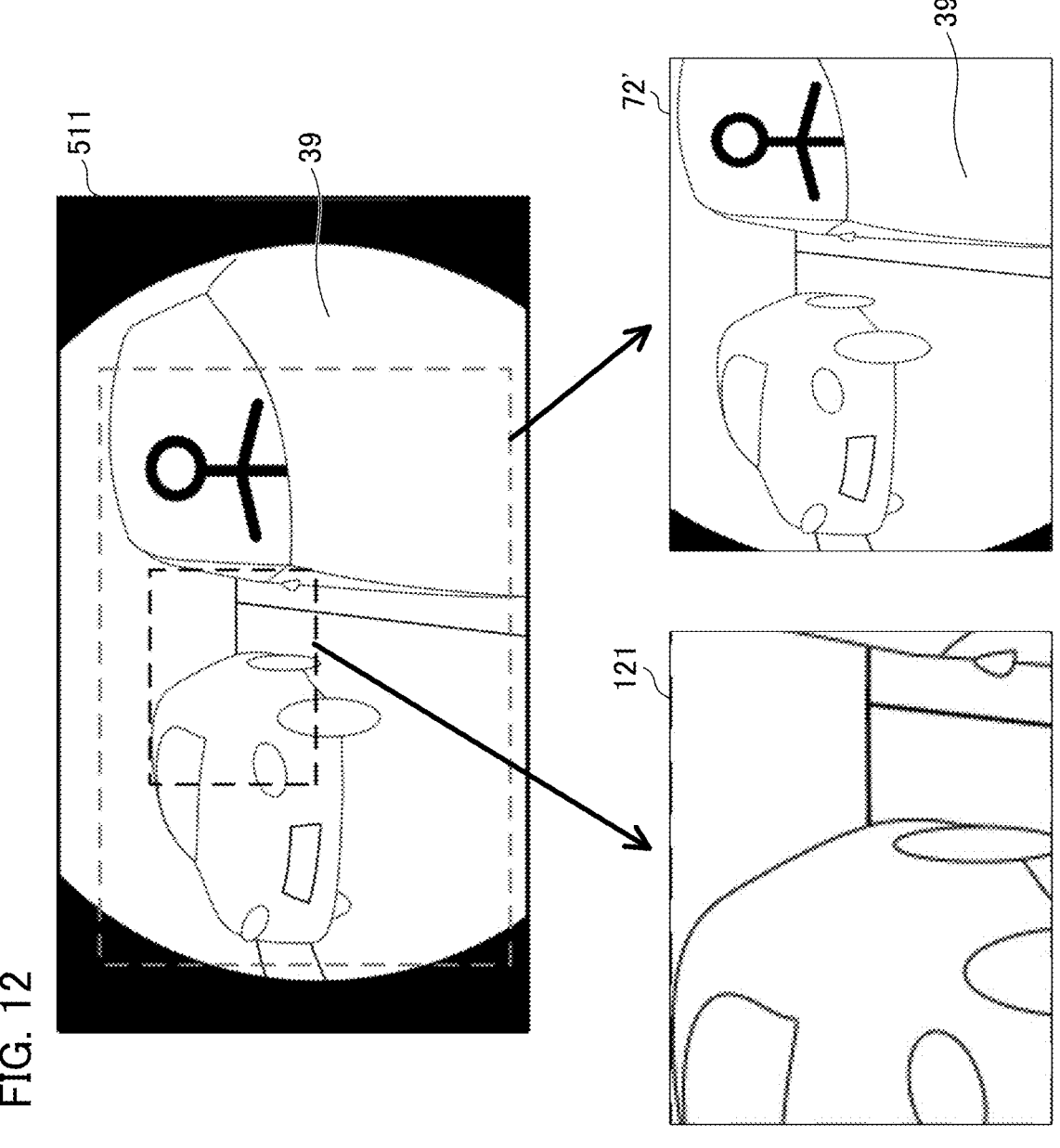
FIG. 12 is a schematic diagram explaining a first viewpoint video image that has been captured in the position of FIG. 11 in the Second Embodiment.

FIG. 12 is a schematic diagram explaining a first viewpoint video image that has been image captured using the arrangement of FIG. 11 in the Second Embodiment. The right lateral direction video image extracting unit 311 is made as is shown in FIG. 12, and performs the extraction of each video image of the right lateral direction video image 121 and the first viewpoint right lateral direction video image 72' from the first viewpoint video image 511 of the right lateral side that has been acquired from the right lateral direction camera 210'.

The right lateral direction video image 121 is the same video image as a general electronic side mirror, and as was described above, is extracted so as to include a range that fulfills the field of vision range for a side mirror for the class II and the class III as stipulated by UN-R46 in relation to the indirect sight of an electronic side mirror. In contrast, the first viewpoint right lateral side direction video image 72' is extracted so as to include at least a portion of the front glass of the automobile and the right lateral side of the automobile 39.

Note that although the left lateral direction video image extracting unit 312 is not shown, it is the same as the right lateral direction video image extracting unit 311 with the only difference being that the right and left are changed. In addition, the right lateral direction video image extracting unit 311 outputs the right lateral direction video image 121 or the first viewpoint right lateral direction video image 72' to the right lateral direction video image output IF 322. In addition, the left lateral direction video image extracting unit 312 outputs the left lateral direction video image or the first viewpoint left lateral direction video image 73' to the left lateral direction video image output IF 323.

Figure 13:
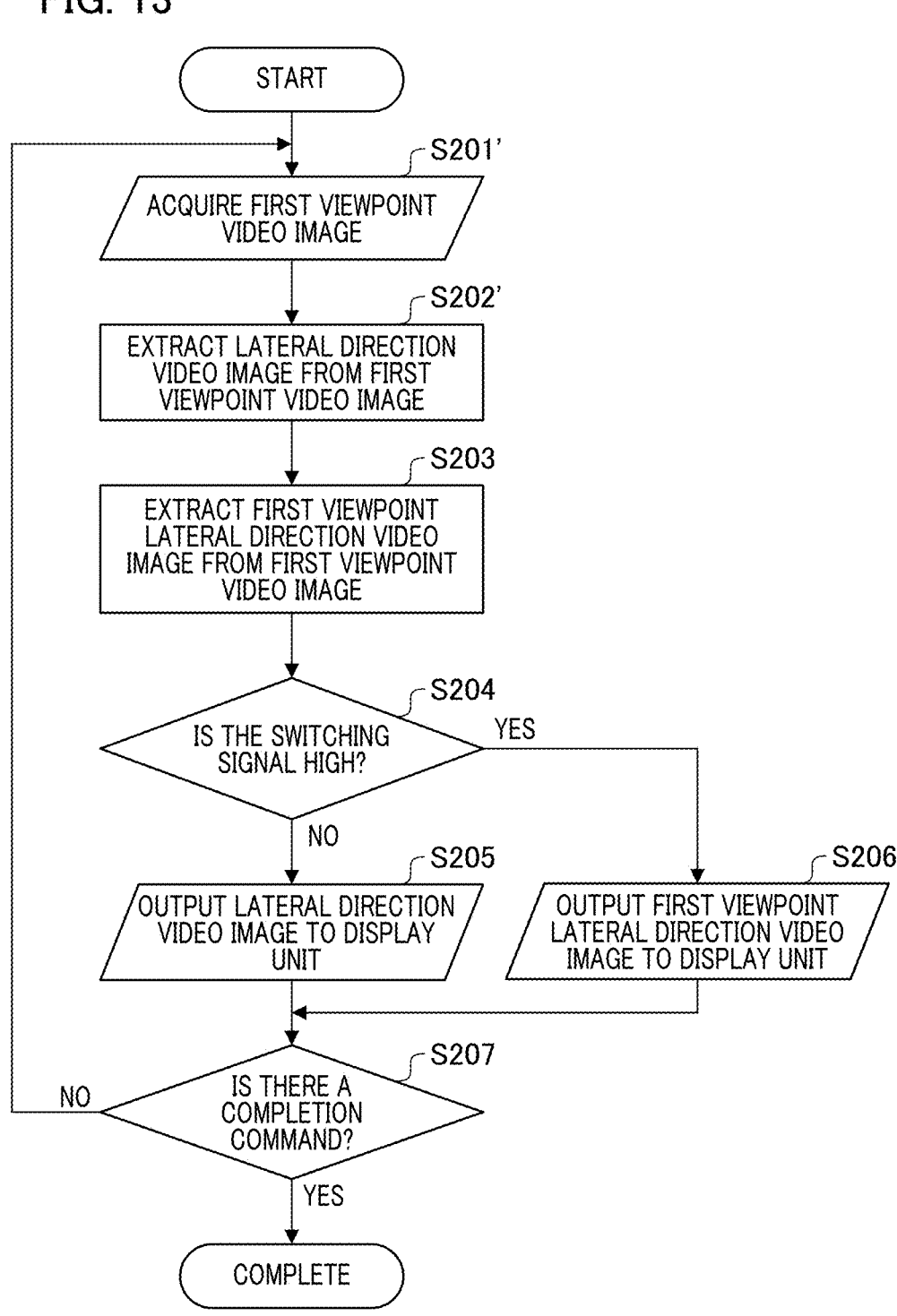
FIG. 13 is a flowchart explaining an example of an image capturing method in which a synthesis processing unit 300 outputs a lateral direction video image in the Second Embodiment.

FIG. 13 is a flowchart showing an example of an image capturing method in which a synthesis processing unit 300' outputs a lateral direction video image in the Second Embodiment, and this shows the operations in which the synthesis processing unit 300' of the Second Embodiment switches between each video image of the right lateral direction video image or the left lateral direction video image and outputs this to the display unit 400. Note that each processing in FIG. 13 is performed in order by a CPU that is not shown and that serves as a computer of the synthesis processing unit 300' executing a computer program that has been stored on a memory that is also not shown.

The processing for the steps S203 to S207 in FIG. 13 is the same as the processing for the steps S203 to S207 in FIG. 9, and therefore an explanation thereof has been omitted.

During step S201', the first viewpoint video image 511, which captures images of a range that includes the right lateral direction and the front glass of the automobile, is acquired from the right lateral direction camera 210'. In addition, the first viewpoint video image 512, which has captured images of a range including the left lateral direction and the front glass of the automobile, is acquired from the left lateral direction camera 220'. In this context, the first viewpoint video images 511 and 512 are input into the video image extracting unit 310. After this, the processing proceeds to step S202'.

During step S202', a right lateral direction video image and a left lateral direction video image are extracted from the first viewpoint video image 511 and 512. In this context, the right lateral direction video image and the left lateral direction video image are extracted so as to include the range that is stipulated by UN-R46 in relation to the indirect visibility of each electronic side mirror. After this, the right lateral direction video image and the left lateral direction video image are input into the video image output unit 320. After this, the processing proceeds to step S203.

As was explained above, according to the Second Embodiment, the right lateral direction camera 210' is disposed in the right lateral direction of the front glass of the automobile, and the left lateral direction camera 220' is disposed in the left lateral direction of the front glass of the automobile. In addition, a range in the rear direction of the automobile is image captured by the right lateral direction camera 210' so as to include the right lateral direction and the front glass of the automobile. In addition, a range in the rear direction of the automobile is image captured by the left lateral direction camera 220' such that the left lateral direction and the front glass of the automobile are included.

By using such a configuration, it is possible to perform image capturing of a video image of the right lateral direction for use in the electronic side mirror and image capturing for the first viewpoint video image 511 of the right lateral direction at the same time in the right lateral direction. In addition, it is possible to perform image capturing of a video image of the left lateral direction for use in the electronic side mirror and the image capturing of the first viewpoint video image 512 of the left lateral direction at the same time in the left lateral direction. Therefore, the number of cameras is controlled, and it is possible to realize a vehicle periphery image capturing system in which it is possible to grasp the relationship between the automobile and the peripheral conditions thereof.

Note that although an example has been explained in the above-described embodiments in which an automobile serves as the movable apparatus, the above-described embodiments are not limited to an automobile, and the movable apparatus may be any kind of apparatus that can be moved such as a motorcycle, a ship, an airplane, a robot, a drone, or the like.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the image capturing apparatus or the like through a network or various storage media. Then, a computer (or a CPU, an MPU, or the like) of the image capturing apparatus or the like may be configured to read and execute the program. In such a case, the program and the storage medium storing the program configure the present invention.

In addition, the present invention includes those realized using at least one processor or circuit configured to perform functions of the embodiments explained above. For example, a plurality of processors may be used for distribution processing to perform functions of the embodiments explained above.

This application claims the benefit of priority from Japanese Patent Application No. 2023-204718, filed on Dec. 4, 2023, which is hereby incorporated by reference herein in its entirety.

What is claimed is:

1. An image capturing apparatus disposed on a movable apparatus, the image capturing apparatus comprising:
an image capturing unit configured to capture images of (1) a portion or the entirety of a front side transparent member of the movable apparatus and (2) at least one of a region on the right lateral side and a region on the left lateral side of the movable apparatus, at the same time as video images,
wherein the image capturing unit is disposed in front of the front side transparent member of the movable apparatus,
wherein the image capturing unit comprises an optical system and an image capturing element,
wherein the optical system has different image forming magnifications between (1) a first angle of view that includes the center of the optical axis and (2) a second angle of view that is more towards the peripheral side than the first angle of view,
wherein a light receiving surface of the image capturing element comprises (1) a first region in which images are captured of objects that are included in the first angle of view and (2) a second region in which images are captured of objects that are included in the second angle of view, and
wherein a pixel number per unit angle of view in the second region is larger than a pixel number per unit angle of view in the first region.

2. The image capturing apparatus according to claim 1, wherein the image capturing unit captures images of the base of the front side transparent member using the first region.

3. The image capturing apparatus according to claim 1, wherein the image capturing unit:
captures images of the left lateral side region of the movable apparatus and a portion of the front side transparent member at the same time in a case in which images are being captured of a portion of the left side of the front transparent member; and captures images of the right lateral side region of the movable apparatus and a portion of the front side transparent member at the same time in a case in which images are being captured of a portion of the right side of the front side transparent member.

4. The image capturing apparatus according to claim 1, wherein the optical axis of the image capturing unit is disposed so as to face the rear direction of the movable apparatus.

5. The image capturing apparatus according to claim 1, wherein the image capturing unit is a first image capturing unit that is configured to be disposed in the left front direction from the center of the front side transparent member,
wherein the image capturing apparatus further comprises a second image capturing unit configured to be disposed in the right front direction from the center of the front side transparent member,
wherein the second image capturing unit comprises an optical system and an image capturing element, wherein the optical system has different image forming magnifications between a first angle of view that includes the center of the optical axis, and a second angle of view that is more towards the peripheral side than the first angle of view, wherein a light receiving surface of the image capturing element comprises (1) a first region in which images are captured of objects that are included in the first angle of view and (2) a second region in which images are captured of objects that are included in the second angle of view, and wherein a pixel number per unit angle of view in the second region is larger than a pixel number per unit angle of view in the first region, and
wherein the optical axis of the first image capturing unit and the optical axis of the second image capturing unit are disposed so as to face the rear direction of the movable apparatus.

6. The image capturing apparatus according to claim 1, comprising at least one processor or circuit configured to function as:
an image extracting unit configured to extract a region comprising the front side transparent member, and at least one of the right lateral region and the left lateral region of the movable apparatus from the video image that has been captured by the image capturing unit as an extracted video image; and
a video image output unit configured to output the extracted video image to a display unit.

7. The image capturing apparatus according to claim 6, wherein the at least one processor or circuit is further configured to function as a control information acquisition unit configured to acquire control information for the movable apparatus,
wherein the video image output unit selects between (1) the video image captured by the image capturing unit and (2) the extracted video image based on the control information, and outputs the selected image.

8. A movable apparatus on which the image capturing apparatus according to claim 1 has been installed.

9. The movable apparatus according to claim 8, wherein the movable apparatus is an automobile, a motorcycle, a ship, or an airplane.

10. The movable apparatus according to claim 8, wherein the movable apparatus is a robot or a drone.

11. The movable apparatus according to claim 8, wherein the front side transparent member of the movable apparatus is a front window of the movable apparatus, the front window comprising glass.

12. The movable apparatus according to claim 11, wherein the movable apparatus is an automobile.

13. The movable apparatus according to claim 12, wherein the optical axis of the image capturing unit is disposed so as to face the rear direction of the automobile.

14. The image capturing apparatus according to claim 1, wherein the front side transparent member of the movable apparatus is a front window of the movable apparatus.

15. The image capturing apparatus according to claim 14, wherein the front window comprises glass.

16. The image capturing apparatus according to claim 15, wherein the movable apparatus is an automobile.

17. The image capturing apparatus according to claim 1, wherein the optical system comprises a lens.

18. The image capturing apparatus according to claim 1, wherein the imaging element comprises a CMOS image sensor or a CCD image sensor.

19. An image capturing method using an image capturing apparatus disposed on a movable apparatus, wherein the image capturing apparatus comprises an image capturing unit configured to capture images of (1) a portion or the entirety of a front side transparent member of the movable apparatus and (2) at least one of a right lateral region and a left lateral region of the movable apparatus, at the same time as video images, and wherein the image capturing unit is disposed in front of the front side transparent member of the movable apparatus, the method comprising:

extracting a region comprising the front side transparent member and at least one of the right lateral region and the left lateral region of the movable apparatus as an extracted video image from the video image that has been captured by the image capturing unit;

acquiring control information for the movable apparatus; and switching and outputting, to a display unit, a selected one of (1) the video image that has been captured by the image capturing unit and (2) the extracted video image, based on the control information, wherein the image capturing unit comprises an optical system and an image capturing element, wherein the optical system has different image forming magnifications between (1) a first angle of view that includes the center of the optical axis and (2) a second angle of view that is more towards the peripheral side than the first angle of view, wherein a light receiving surface of the image capturing element comprises (1) a first region in which images are captured of objects that are included in the first angle of view and (2) a second region in which images are captured of objects that are included in the second angle of view, and wherein a pixel number per unit angle of view in the second region is larger than a pixel number per unit angle of view in the first region.

20. A non-transitory computer-readable storage medium configured to store a computer program to control an image capturing apparatus disposed on a movable apparatus, wherein the image capturing apparatus comprises an image capturing unit configured to capture images of (1) a portion or the entirety of a front side transparent member of the movable apparatus and (2) at least one of a right lateral region and a left lateral region of the movable apparatus, at the same time as video images, wherein the image capturing unit is disposed in front of the front side transparent member of the movable apparatus, and wherein the computer program comprises instructions for executing a method comprising:

extracting a region comprising the front side transparent member and at least one of the right lateral region and the left lateral region of the movable apparatus as an extracted video image from the video image that has been captured by the image capturing unit;

acquiring control information for the movable apparatus; and switching and outputting, to a display unit, a selected one of (1) the video image that has been captured by the image capturing unit and (2) the extracted video image, based on the control information, wherein the image capturing unit comprises an optical system and an image capturing element, wherein the optical system has different image forming magnifications between (1) a first angle of view that includes the center of the optical axis and (2) a second angle of view that is more towards the peripheral side than the first angle of view, wherein a light receiving surface of the image capturing element comprises (1) a first region in which images are captured of objects that are included in the first angle of view and (2) a second region in which images are captured of objects that are included in the second angle of view, and wherein a pixel number per unit angle of view in the second region is larger than a pixel number per unit angle of view in the first region.

* * * * *